United States Patent
Li et al.

(10) Patent No.: US 12,075,158 B2
(45) Date of Patent: Aug. 27, 2024

(54) CONTROL METHOD AND OPTICAL DEVICE FOR DETECTING A POSITION OF A LENS AND ACCORDINGLY MOVE THE LENS INTO AN ALLOWABLE RANGE

(71) Applicant: QISDA CORPORATION, Taoyuan (TW)

(72) Inventors: Te-Yuan Li, Hualien County (TW); Chih-Wei Cho, New Taipei (TW)

(73) Assignee: Qisda Corporation, Taoyuan (TW)

( * ) Notice: Subject to any disclaimer, the term of this patent is extended or adjusted under 35 U.S.C. 154(b) by 164 days.

(21) Appl. No.: 17/834,880

(22) Filed: Jun. 7, 2022

(65) Prior Publication Data
US 2023/0336868 A1  Oct. 19, 2023

(30) Foreign Application Priority Data
Apr. 14, 2022 (CN) .......................... 202210390764.0

(51) Int. Cl.
H04N 23/67 (2023.01)
H04N 23/617 (2023.01)

(52) U.S. Cl.
CPC .......... *H04N 23/67* (2023.01); *H04N 23/617* (2023.01)

(58) Field of Classification Search
CPC ...... H04N 23/67; H04N 23/617; G02B 7/285; G02B 7/08
See application file for complete search history.

(56) References Cited

U.S. PATENT DOCUMENTS

| | | | |
|---|---|---|---|
| 2016/0119533 A1* | 4/2016 | Okawa | H04N 23/69 348/345 |
| 2017/0223347 A1* | 8/2017 | Ezawa | H04N 23/50 |
| 2020/0382716 A1* | 12/2020 | Uchiyama | H04N 23/959 |
| 2021/0120182 A1* | 4/2021 | In | H04N 23/67 |

* cited by examiner

Primary Examiner — Gevell V Selby

(57) ABSTRACT

A control method for an optical device includes a detector detecting a current position of a lens, a processor calculating a distance between the current position and a target position, the processor determining whether the current position is within a predetermined range according to the distance, and the processor controlling a driving device to move the lens into an allowable range according to whether the current position is within the predetermined range. The predetermined range and the allowable range are corresponding to the target position.

19 Claims, 7 Drawing Sheets

CONTROL METHOD AND OPTICAL DEVICE FOR DETECTING A POSITION OF A LENS AND ACCORDINGLY MOVE THE LENS INTO AN ALLOWABLE RANGE

BACKGROUND OF THE INVENTION

1. Field of the Invention

The disclosure is related to a control method and an optical device, and more particularly, a control method and an optical device for detecting a position of a lens and accordingly move the lens into an allowable range.

2. Description of the Prior Art

As the applications of optical devices grow, the accuracy of the lens position requires more and more attention. For example, when using a projector, the user expects that the lens can be adjusted to a predetermined position so the image can be desirably projected.

However in reality, when moving a dual axis lens of a projector, the lens often fails to reach the predetermined position effectively due to the interference of gravity or other factors. For example, when adjusting a lens, if the lens is moved horizontally, since the portions of the dual axis lens are integrally designed, the vertical position of lens is affected, wrecking the accuracy and wasting more time to fix the issue. Similarly, when moving the lens vertically, the horizontal position of lens is affected, and more time has to be spent to align the lens.

Thus far, there is no suitable approach to move the lens of an optical device to the desirable position efficiently.

SUMMARY OF THE INVENTION

An embodiment provides a control method for an optical device. The control method includes a detector detecting a current position of a lens, a processor calculating a distance between the current position and a target position, the processor determining whether the current position is within a predetermined range according to the distance, and the processor controlling a driving device to move the lens into an allowable range according to whether the current position is within the predetermined range. The predetermined range and the allowable range are corresponding to the target position.

Another embodiment provides an optical device including a lens and a control system. The control system includes a detector, a driving device and a processor. The detector is configured to detect a current position of the lens. The driving device is coupled to the lens, and configured to move the lens. The processor is coupled to the detector and the driving device, and configured to calculate a distance between the current position and a target position, and control the driving device accordingly. The processor determines whether the current position is within a predetermined range according to the distance. The processor controls the driving device to move the lens into an allowable range according to whether the current position is within the predetermined range. The predetermined range and the allowable range are corresponding to the target position.

Another embodiment provides an optical device including a lens and a control system. The control system includes a detector, a driving device and a processor. The detector is configured to detect a current position of the lens. The driving device is coupled to the lens, and configured to move the lens. The processor is coupled to the detector and the driving device, and configured to calculate a distance between the current position and a target position, and determine whether a last movement of the lens is along the first reference axis to control the driving device accordingly. If the last movement of the lens is not along the first reference axis, the driving device moves the lens along the first reference axis to move the lens into the allowable range. If the last movement of the lens is along the first reference axis, the driving device moves the lens along a second reference axis perpendicular to the first reference axis to move the lens into the allowable range.

These and other objectives of the present invention will no doubt become obvious to those of ordinary skill in the art after reading the following detailed description of the preferred embodiment that is illustrated in the various figures and drawings.

DETAILED DESCRIPTION

In order to deal with the abovementioned problems, solutions are provided according to embodiments as below. In the text, when it is mentioned a value is equal to another value, the difference of the two values is less than 10% of each of the two values.

Figure 1:
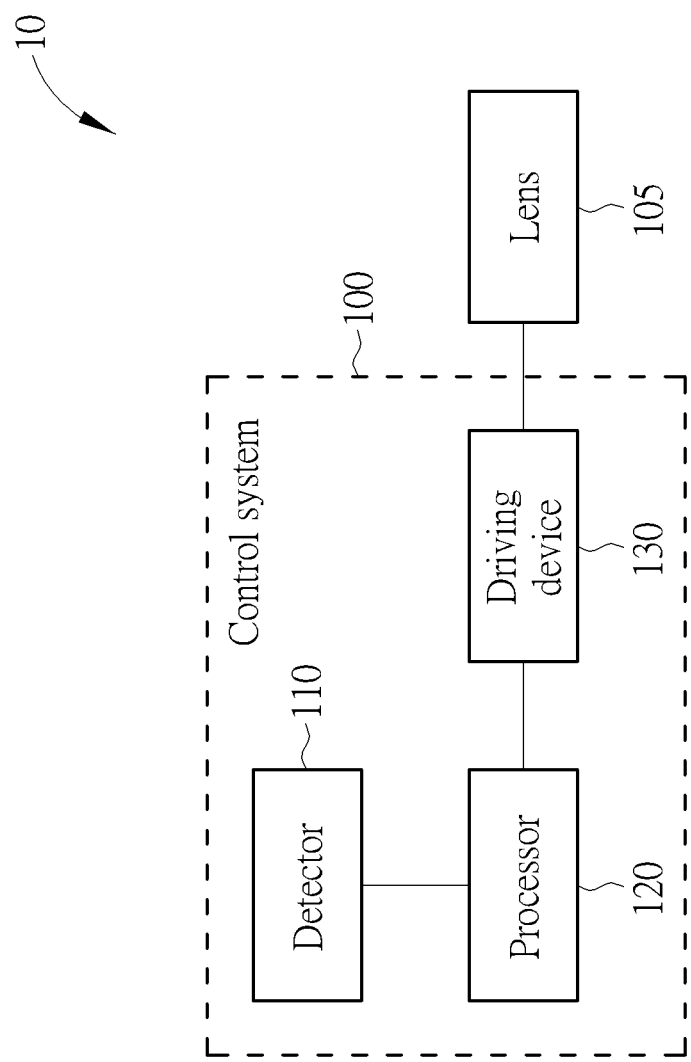
FIG. 1 illustrates an optical device according to an embodiment.
Figure 2:
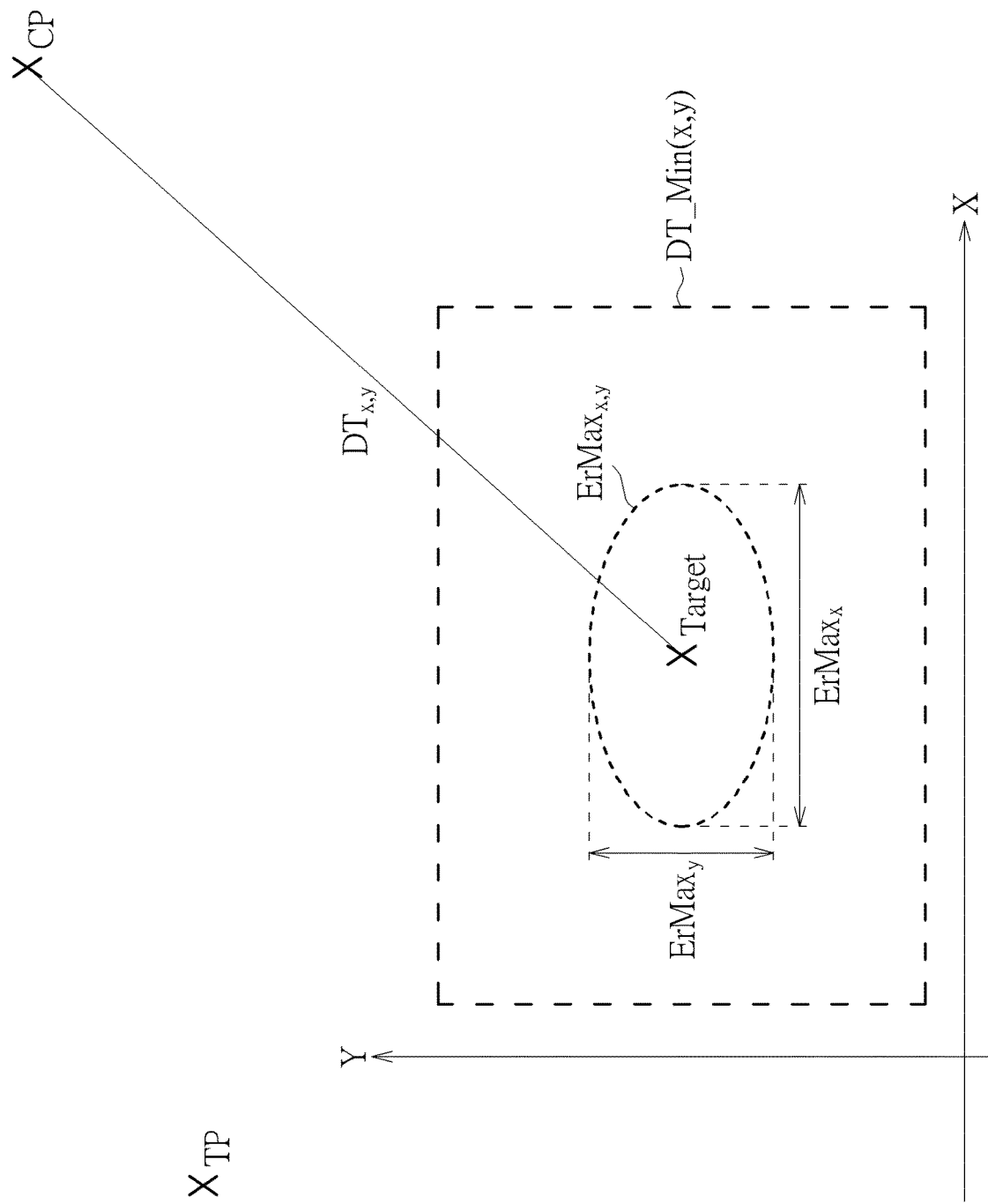
FIG. 2 illustrates the position of the lens of FIG. 1.

FIG. 1 illustrates an optical device 10 according to an embodiment. The optical device 10 includes a lens 105 and a control system 100. The control system 100 includes a detector 110, a processor 120 and a driving device 130. FIG. 2 illustrates the position of the lens 105 in FIG. 1.

Figure 3:
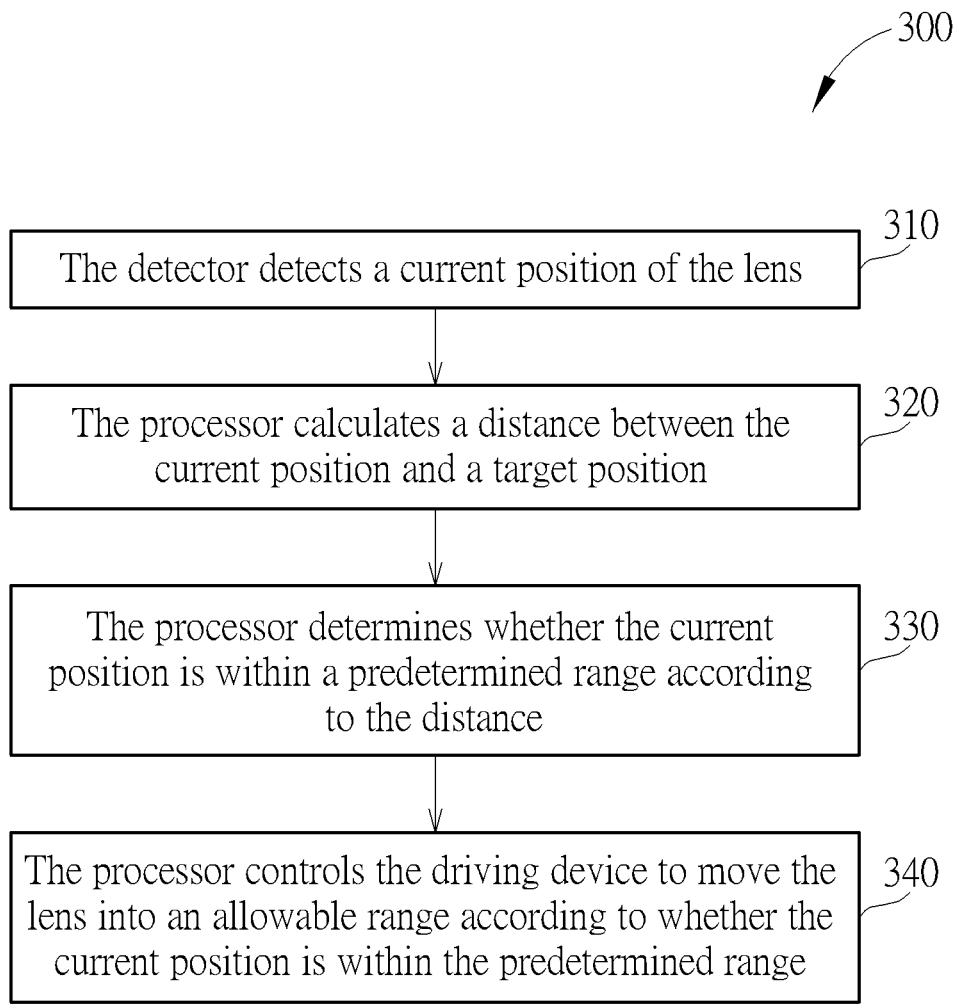
FIG. 3 illustrates a control method of the optical device of FIG. 1.

FIG. 3 illustrates a control method 300 of the optical device 10 in FIG. 1. The control method 300 can include the following steps.

Step 310: the detector 110 detects a current position CP of the lens 105;

Step 320: the processor 120 calculates a distance $DT_{x,y}$ between the current position CP and a target position Target;

Step 330: the processor 120 determines whether the current position CP is within a predetermined range DT_Min(x,y) according to the distance $DT_{x,y}$; and Step 340: the processor controls the driving device 130 to move the lens 105 into an allowable range $ErMax_{x,y}$ according to whether the current position CP is within the predetermined range DT_Min(x,y).

In FIG. 2, the current position CP of the lens 105 is outside the predetermined range DT_Min(x,y), however, FIG. 2 is an example instead of limiting the scope of embodiments. The current position CP of the lens 105 may be within the allowable range $ErMax_{x,y}$, or may be outside the allowable range $ErMax_{x,y}$ but within the predetermined range $DT\_Min(x,y)$.

The predetermined range $DT\_Min(x,y)$ and the allowable range $ErMax_{x,y}$ can be corresponding to the target position Target. The target position Target is within the allowable range $ErMax_{x,y}$. The allowable range $ErMax_{x,y}$ is within the predetermined range $DT\_Min(x,y)$. The positions and ranges of FIG. 2 are described as below.

The target position Target is the intended destination when moving the lens 105. In other words, the purpose of applying the control system 100 and the control method 300 is to move the lens 105 to the target position Target.

The allowable range $ErMax_{x,y}$ is the desirable range of the lens 105. In other words, if the lens 105 is anywhere within the allowable range $ErMax_{x,y}$, the lens 105 can be regarded as being at a correct position. The allowable range $ErMax_{x,y}$ includes a first allowable range $ErMax_x$ in a first reference axis (e.g. a horizontal axis), and a second allowable range $ErMax_y$ in a second reference axis (e.g. a vertical axis). The first allowable range $ErMax_x$ and second allowable range $ErMax_y$ are further described below. And the first reference axis can be perpendicular to the second reference axis.

The area of predetermined range $DT\_Min(x,y)$ is set for performing the control method 300. When moving the lens 105 from the current position CP, if the current position CP is close the target position Target, the component (e.g. motor) in the driving device 130 may overdrive the lens 105, causing the lens 105 to pass through the target position Target without stopping at the target position Target, and the driving device 130 has to reverse the lens 105 back to the target position Target. However, if the driving device 130 includes a motor, the accuracy is often lower when the motor is reversed. Hence, the driving device 130 may overdrive the lens 105 again, and the motor has to reverse again. As a result, the lens 105 is moved back and forth many times, making movement of the lens 105 highly inefficient. To solve the problem, if the current position CP is within the predetermined range $DT\_Min(x,y)$ but outside the allowable range $ErMax_{x,y}$, it can be determined that the lens 105 is close to the target position Target. The lens 105 can be moved to a predetermined position TP (as shown in FIG. 2) outside the predetermined range $DT\_Min(x,y)$, and then the lens 105 can be moved from the predetermined position TP into the allowable range $ErMax_{x,y}$. By using the predetermined range $DT\_Min(x,y)$ to perform the abovementioned operations, the accuracy and efficiency of moving the lens 105 by the driving device 130 is improved.

In Step 330, the processor 120 can determine whether the current position CP of the lens 105 is within the allowable range $ErMax_{x,y}$ according to the distance $DT_{x,y}$. If the current position CP is within the allowable range $ErMax_{x,y}$, it can be determined the lens 105 is at a correct position, and there is no need to move the lens 105.

In Step 340, if the lens 105 is far from the target position Target, the driving device 130 can move the lens 105 to the target position Target by a larger amount of movement for better efficiency. In another scenario, if the lens 105 is close to the target position Target, the driving device 130 can move the lens 105 towards the target position Target with a minimum amount of movement allowed by the system. Although the efficiency is decreased using the minimum amount of movement, it can avoid overdriving the lens 105 and performing reverse operations.

Figure 4:
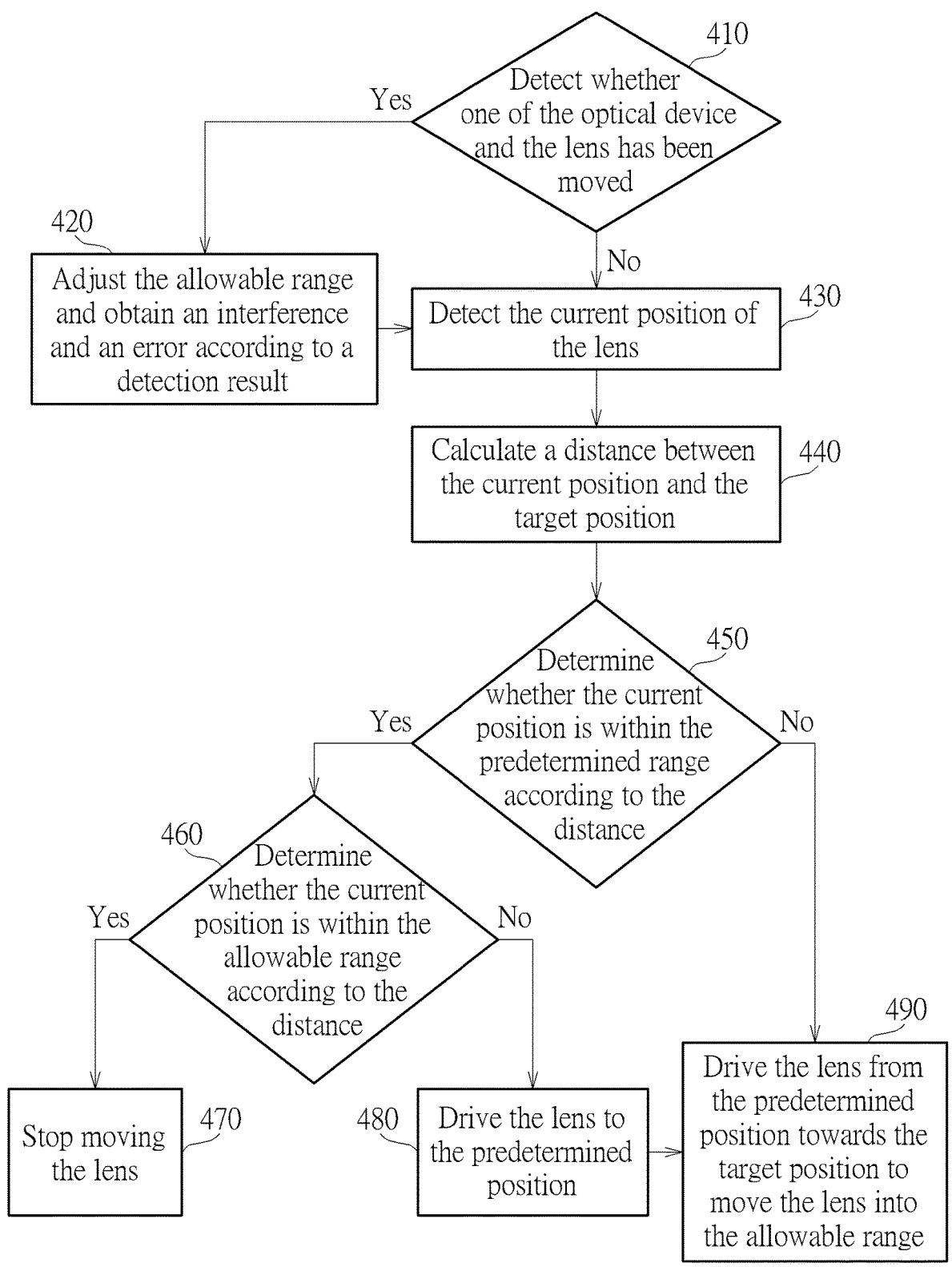
FIG. 4 illustrates a detailed flowchart of the control method for the optical device mentioned in FIG. 1 to FIG. 3.

FIG. 4 illustrates a detailed flowchart of the control method 300 for the optical device 10 mentioned in FIG. 1 to FIG. 3. FIG. 4 provides more details than FIG. 3. In FIG. 4, the following steps can be performed.

Step 410: the detector 110 detects whether at least one of the optical device 10 and the lens 105 has been moved; if so, enter Step 420; otherwise, enter Step 430;

Step 420: the processor 120 adjusts the allowable range $ErMax_{x,y}$, obtains an interference and obtains an error according to a detection result of the detector 110;

Step 430: the detector 110 detects the current position CP of the lens 105;

Step 440: the processor 120 calculates a distance $DT_{x,y}$ between the current position CP and the target position Target;

Step 450: the processor 120 determines whether the current position CP is within the predetermined range $DT\_Min(x,y)$ according to the distance $DT_{x,y}$; if so, enter Step 460; otherwise, enter Step 490;

Step 460: the processor 120 determines whether the current position CP is within the allowable range $ErMax_{x,y}$ according to the distance $DT_{x,y}$; if so, enter Step 470; otherwise, enter Step 480;

Step 470: stop moving the lens 105.

Step 480: the driving device 130 drives the lens 105 to the predetermined position TP outside the predetermined range $DT\_Min(x,y)$; and Step 490: the driving device 130 drives the lens 105 from the predetermined position TP towards the target position Target to move the lens 105 into the allowable range $ErMax_{x,y}$.

Figure 5:
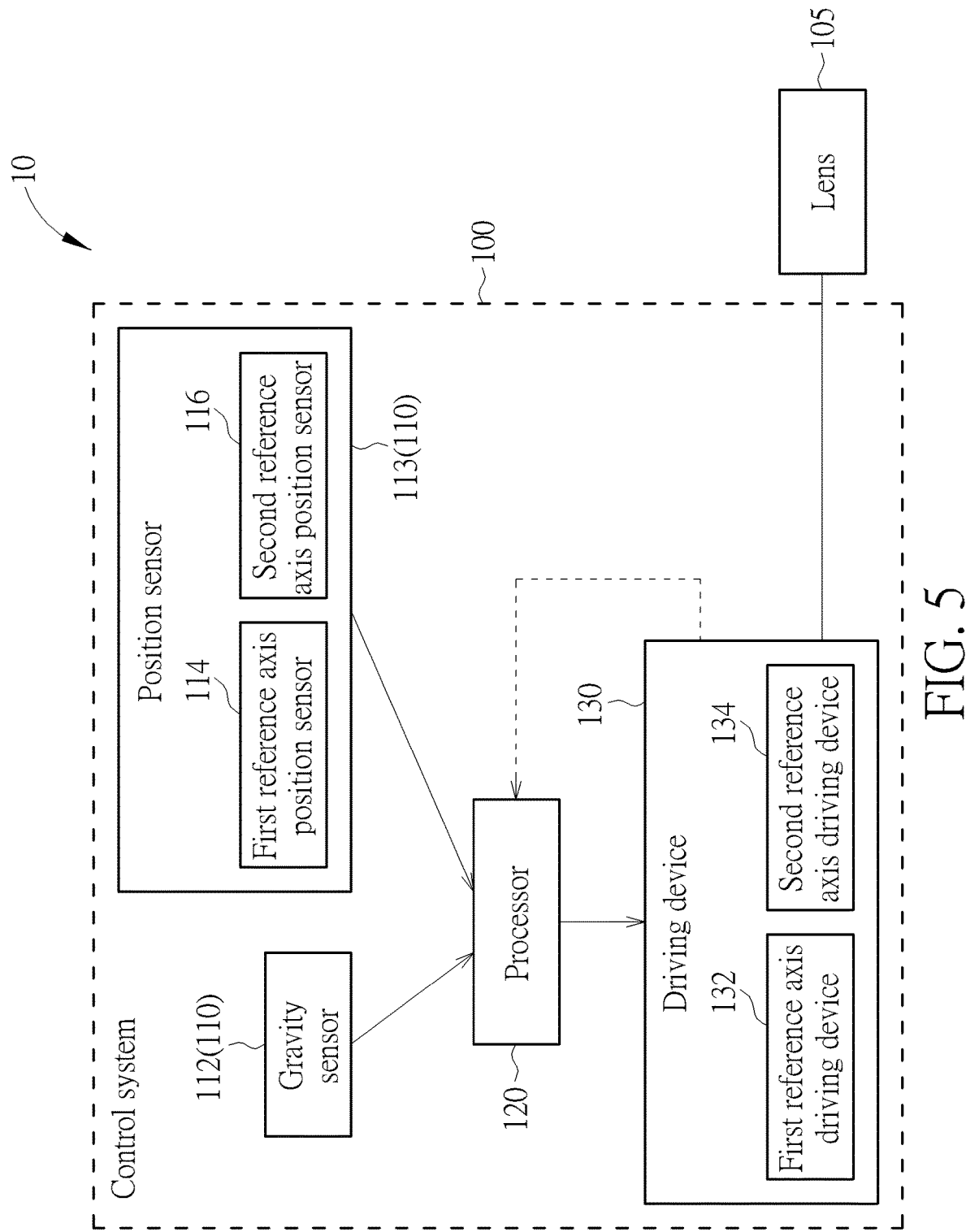
FIG. 5 illustrates the optical device of FIG. 1 according to an embodiment.

In Step 410, for example, a gravity sensor (a.k.a. accelerometer or g-sensor) of the detector 110 can detect whether the optical device 100 has been moved or rotated. In addition, a position sensor of the detector 110 can detect whether the lens 105 has been moved. The gravity sensor and the position sensor are further described below as shown in FIG. 5.

In Step 420, the processor 120 can adjust at least one of the area and the position of the allowable range $ErMax_{x,y}$ according to the detection result of the detector 410 generated in Step 410. The interference and the error mentioned in Step 420 can be used to calculate an amount of movement for moving the lens 105. The interference and the error are further described below.

Step 430 to Step 450 can be corresponding to Step 310 to Step 330 in FIG. 3. Step 460 to Step 490 can be corresponding to Step 340 in FIG. 3.

In Step 460 and Step 470, the lens 105 is determined to be at a correct position (i.e. within the allowable range $ErMax_{x,y}$), so the driving device 130 can stop moving the lens 105. In Step 460 and Step 480, as mentioned above, the lens 105 can be moved to the predetermined position TP, and then moved into the allowable range $ErMax_{x,y}$ to avoid excessive movement of the lens 105 which reduces accuracy and efficiency. In Step 490, the driving device 130 can move the lens 105 from a current position into the allowable range $ErMax_{x,y}$.

When the lens 105 moves along the first reference axis, the lens 105 is often affected in the second reference axis, biasing the position of the lens 105 in the second reference axis. Similarly, when the lens 105 moves along the second reference axis, the lens 105 is often affected in the first reference axis, biasing the position of the lens 105 in the first reference axis. Hence, it is often difficult to position the lens 105 appropriately. For dealing with the difficulty, the processor 120 can control the driving device 130 to alternately move the lens 105 along the first reference axis and along the second reference axis, so as to minimize the unwanted interferences to quickly move the lens 105 to an expected position, that is, within the allowable range ErMax$_{x,y}$.

FIG. 5 illustrates the optical device 10 in FIG. 1 according to an embodiment. FIG. 5 is an example instead of limiting the scope of embodiments. FIG. 5 provides more details than FIG. 1. As shown in FIG. 5, the detector 110 of FIG. 1 can further include a gravity sensor 112 and a position sensor 113. The position sensor 113 can include a first reference axis position sensor 114 and a second reference axis position sensor 116. The gravity sensor 112 can detect whether the optical device 10 has been moved or rotated. For example, if the optical device 10 is embedded in a projector, the gravity sensor 112 can detect whether the projector is rotated by 90 degrees or placed upside down.

The first reference axis position sensor 114 and the second reference axis position sensor 116 of the position sensor 113 can respectively detect whether the position of the lens 105 is changed along the first reference axis and the second reference axis. For example, the first reference axis position sensor 114 and the second reference axis position sensor 116 can include analog-to-digital convertors to convert the analog data to the digital data.

As shown in FIG. 5, the driving device 130 can include a first reference axis driving device 132 and a second reference axis driving device 134. According to the detection result(s) of the gravity sensor 112, the first reference axis position sensor 114 and the second reference axis position sensor 116, the first reference axis driving device 132 and the second reference axis driving device 134 can alternately adjust the position of the lens 105 along the first reference axis and the second reference axis. The driving device 130 can optionally output a signal to the processor 120 to notify the processor 120 of the operation status of the driving device 130.

In FIG. 5 and FIG. 1, if the last movement of the lens 105 is not along the first reference axis (e.g. X axis), the driving device 130 can move the lens 105 along the first reference axis to move the lens 105 into the allowable range ErMax$_{x,y}$. If the last movement of the lens 105 is along the first reference axis, the driving device 130 can move the lens 105 along the second reference axis (e.g. Y axis) perpendicular to the first reference axis to move the lens 105 into the allowable range ErMax$_{x,y}$.

Figure 6:
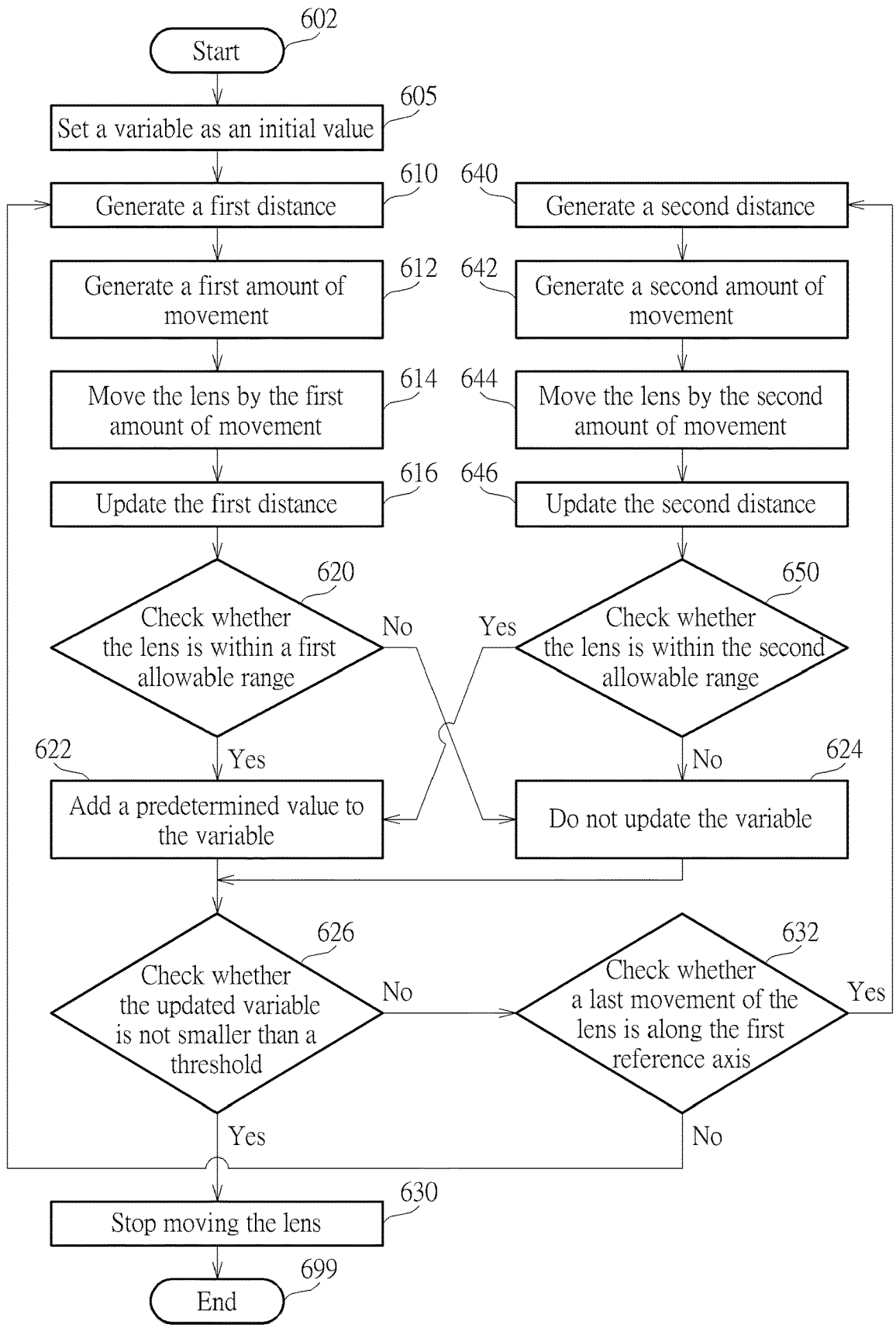
FIG. 6 illustrates that the position of the lens is adjusted alternately along the first reference axis and the second reference axis in the embodiment of FIG. 3.

FIG. 6 illustrates that the position of the lens 105 is adjusted alternately along the first reference axis and the second reference axis in Step 340 of FIG. 3. As shown in FIG. 6, the following steps can be performed.

Step 602: start;
Step 605: the processor 120 sets a variable as an initial value;
Step 610: the processor 120 generates a first distance DT$_x$ corresponding to the first reference axis according to a position of the lens 105 and the target position Target;
Step 612: the processor 120 generates a first amount of movement Move$_x$ according to the first distance DT$_x$;
Step 614: the driving device 130 moves the lens 105 by the first amount of movement Move$_x$ along the first reference axis;
Step 616: the processor 120 updates the first distance DT$_x$;
Step 620: the processor 120 determines whether the lens 105 is within a first allowable range ErMax$_x$ corresponding to the first reference axis and the allowable range ErMax$_{x,y}$ according to the updated first distance DT$_x$; if so, enter Step 622; otherwise; enter Step 624;
Step 622: the processor 120 adds a predetermined value to the variable to update the variable; enter Step 626;
Step 624: the processor 120 does not update the variable; enter Step 626;
Step 626: the processor checks whether the updated variable is not smaller than a threshold; if so, enter Step 630; otherwise, enter Step 632;
Step 630: the processor 120 determines the lens 105 has been moved into the allowable range ErMax$_{x,y}$ and stops moving the lens 105; enter Step 699;
Step 632: the processor 120 determines whether a last movement of the lens 105 is along the first reference axis; if so, enter Step 640; otherwise, enter Step 610;
Step 640: the processor 120 generates a second distance DT$_y$ corresponding to the second reference axis according to the position of the lens 105 and the target position Target;
Step 642: the processor 120 generates a second amount of movement Move$_y$ according to the second distance DT$_y$;
Step 644: the driving device 130 moves the lens 105 by the second amount of movement Move$_y$ along the second reference axis;
Step 646: the processor 120 updates the second distance DT$_y$;
Step 650: the processor 120 determines whether the lens 105 is within the second allowable range ErMax$_y$ corresponding to the first second reference axis and the allowable range ErMax$_{x,y}$ according to the updated second distance DT$_y$; if so, enter Step 622; otherwise, enter Step 624; and
Step 699: end.

In Step 605, the initial value of the variable can be zero. In Step 610, the first distance DT$_x$ can be a length of the distance DT$_{x,y}$ of FIG. 2 projected on the first reference axis. In Step 612, the first amount of movement Move$_x$ can be equal to a difference of the first distance DT$_x$ and a first error NoiseMax$_x$(DTx), and it can be expressed as: Move$_x$=DT$_x$−NoiseMax$_x$(DT$_x$). The first error NoiseMax$_x$(DTx) can be a positive value to avoid excessive movement of the lens 105 which reverses the driving device 130.

The first error NoiseMax$_x$(DT$_x$) can be described as below. The processor 120 can generate a first interference value Interference$_y$(DT$_y$) according to a movement of the lens 105 along the second reference axis (e.g. Y axis of FIG. 2). The first interference value Interference$_y$(DT$_y$) is related to the interference to the lens 105 along the first reference axis (e.g. X axis of FIG. 2), where interference is caused by the movement of the lens 105 along the second reference axis.

The processor 120 can generate a first mechanical weight Gravity$_{x,G,Dir}$(DT$_x$) and a first interference weight Gravity$_{y,G,Dir}$(DT$_y$) according to the gravity to reflect the impact of the gravity on the lens 105. The processor 120 can generate the first error NoiseMax$_x$(DT$_x$) corresponding to the first reference axis according to a product of a first mechanical error Noise$_x$(DT$_x$) and the first mechanical weight Gravity$_{x,G,Dir}$(DT$_x$) and a product of the first interference value Interference$_y$(DT$_y$) and the first interference weight Gravity$_{y,G,Dir}$(DT$_y$). It can be expressed as:

$$NoiseMax_x(DT_x)=Noise_x(DT_x)*Gravity_{x,G,Dir}(DT_x)+Interference_y(DT_y)*Gravity_{y,G,Dir}(DT_y).$$

In the above equation, the impact of the gravity is considered. In the equation, DT$_x$ is the distance between the lens 105 and the target position Target along the first reference axis. The function NoiseMax$_x$ is the maximum estimated noise from the lens 105 to the target position Target along the first reference axis. The function Noise is the noise along the first reference axis with no interference and no gravity. The function $Gravity_{x,G,Dir}$ is for weighting noise to reflect the gravity with regarding different directions along the first reference axis. In the function $Gravity_{x,G,Dir}$, Dir refers to the direction, and G refers to the direction of the gravity when disposing the device. For example, if the gravity along the first reference axis points to the left, and Dir also points to the left, the function $Gravity_{x,G,Dir}$ is an enhancing function. $DT_y$ is the distance between the lens 105 and the target position Target along the second reference axis. The function $Interference_y$ refers to the interference generated along the first reference axis caused by the movement of the lens 105 along the second reference axis. Here, $Noise_x(DT_x)*Gravity_{x,G,Dir}(DT_x)$ refers to the noise without interference, and $Interference_y(DT_y)*Gravity_{x,G,Dir}(DT_y)$ refers to the impact on the lens 105 caused by the movement along the second reference axis. Hence, the sum of the two terms reflects the impact on the lens 105.

The initial value of Step 605 can be 0, the predetermined value of Step 622 can be 1, and the threshold of Step 626 can be 3. If the variable has accumulated to be 3, it means the position of the lens 105 has been checked three times, and the result of each check has shown the lens 105 is within the first allowable range $ErMax_x$ and the second allowable range $ErMax_y$. Hence, it can be determined that the lens 105 is within the allowable range $ErMax_{x,y}$ (shown in FIG. 2) in Step 630, and Step 699 can be performed to end the flow. This is an example instead of limiting the scope of embodiments. The initial value of Step 605, the predetermined value of Step 622 and the threshold of Step 626 can be set according to different requirements.

In Step 632, if the last movement of the lens 105 is along the first reference axis, Step 640 to Step 650 can be performed to move the lens 105 along the second reference axis. In Step 632, if the last movement of the lens 105 is not along the first reference axis, Step 610 to Step 620 can be performed to move the lens 105 along the first reference axis. Hence, the lens 105 can be moved along the first reference axis and the second reference axis alternately to reduce the interference along one reference axis caused by the movement along the other reference axis. As a result, the lens 105 is moved into the allowable range $ErMax_{x,y}$ earlier.

Step 640 to Step 644 are similar to Step 610 to Step 614, but the lens 105 is moved along the second reference axis in Step 640 to Step 644.

In Step 612, the second amount of movement $Move_y$ can be equal to the difference of the second distance $DT_y$ and the second error $NoiseMax_y(DT_y)$, and it can be expressed as: $Move_y=DT_y-NoiseMax_y(DT_y)$. The second error $NoiseMax_y(DT_y)$ can be a positive value to avoid overdrive of the lens 105, causing the driving device 130 to reverse.

The second error $NoiseMax_y(DT_y)$ can be described as below. The processor 120 can generate a second interference value $Interference_x(DT_x)$ according to a movement of the lens 105 along the first reference axis. The second interference value $Interference_x(DT_x)$ is related to the interference to the lens 105 along the second reference axis, where the interference is caused by the movement of the lens 105 along the first reference axis.

The processor 120 can generate a second mechanical weight $Gravity_{y,G,Dir}(DT_y)$ and a second interference weight $Gravity_{x,G,Dir}(DT_x)$ according to the gravity to reflect the impact of the gravity on the lens 105. The processor 120 can generate the second error $NoiseMax_y(DT_y)$ corresponding to the second reference axis according to a product of the second mechanical error $Noise_y(DT_y)$ and the second mechanical weight $Gravity_{y,G,Dir}(DT_y)$ and a product of the second interference value $Interference_x(DT_x)$ and the second interference weight $Gravity_{x,G,Dir}(DT_x)$. For example, it can be expressed as:

$$NoiseMax_y(DT_y)=Noise_y(DT_y)*Gravity_{y,G,Dir}(DT_y)+Interference_x(DT_x)*Gravity_{x,G,Dir}(DT_x)$$

In the above equation, the impact of the gravity is considered. In the equation, $DT_y$ is the distance between the lens 105 and the target position Target along the second reference axis. The function $NoiseMax_y$ is the maximum estimated noise from the lens 105 to the target position Target along the second reference axis. The function $Noise_y$ is the noise along the second reference axis with no interference and no gravity. The function $Gravity_{y,G,Dir}$ is for weighting noise to reflect the gravity with regarding different directions along the second reference axis. In the function $Gravity_{y,G,Dir}$, Dir refers to the direction, and G refers to the direction of the gravity when disposing the device. For example, if the gravity points downward, and Dir also points downward, the function $Gravity_{y,G,Dir}$ is an enhancing function. $DT_x$ is the distance between the lens 105 and the target position Target along the first reference axis. The function $Interference_x$ refers to the interference generated along the second reference axis caused by the movement of the lens 105 along the first reference axis. Here, $Noise_y(DT_y)*Gravity_{y,G,Dir}(DT_y)$ refers to the noise without interference, and $Interference_x(DT_x)*Gravity_{x,G,Dir}(DT_x)$ refers to the impact on the lens 105 caused by the movement along the first reference axis. Hence, the sum of the two terms reflects the impact on the lens 105.

The optical device 10 controlled by the control system 100 of FIG. 1 and the control method 300 of FIG. 3 can include a projector, and the target position Target of the lens 105 can be corresponding to a position of an image projected by the projector. Hence, by moving the lens 105 toward the target position Target into the allowable range $ErMax_{x,y}$, the image projected by the projector is automatically adjusted to a correct position.

Figure 7:
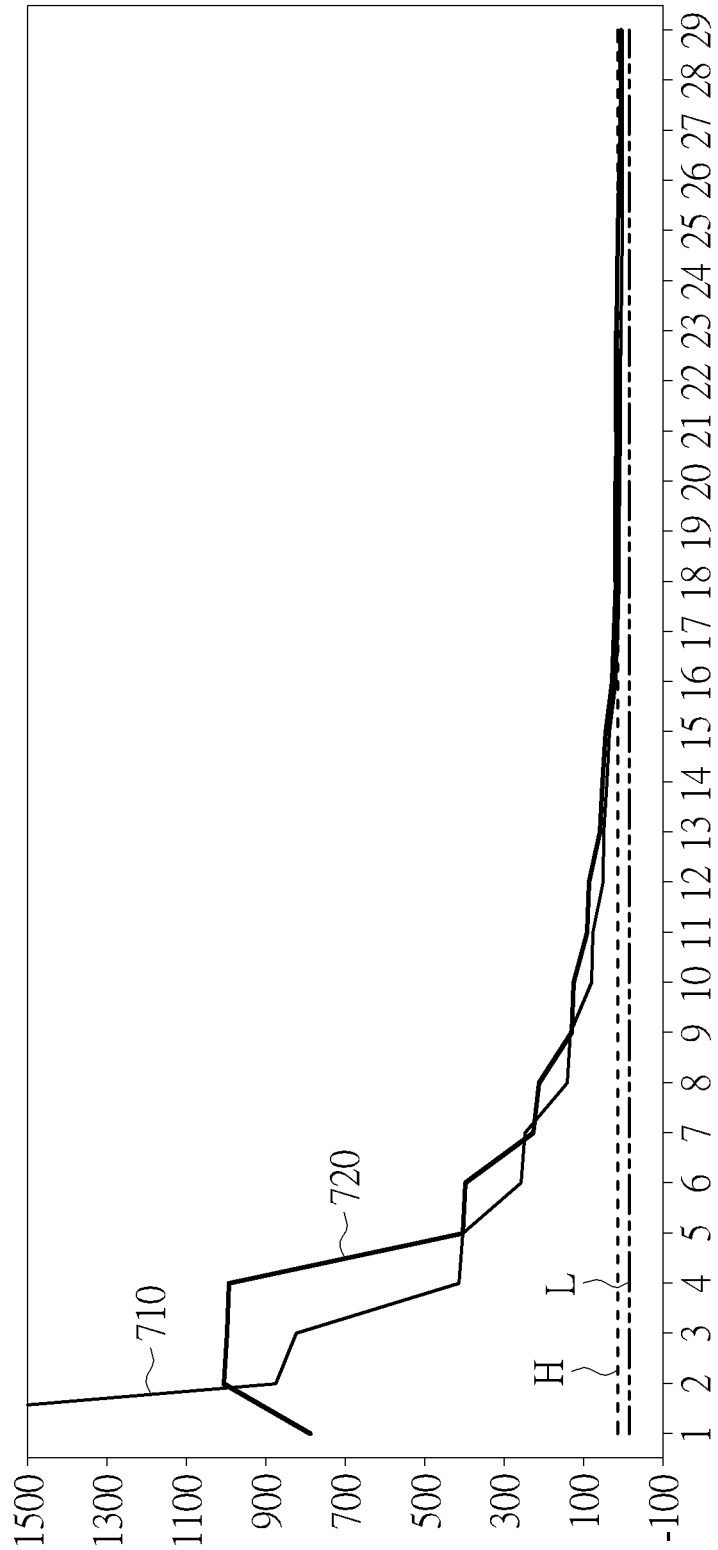
FIG. 7 illustrates a diagram of adjusting the position of lens with the flow of FIG. 6.

FIG. 7 illustrates a diagram of adjusting the position of lens 105 with the flow of FIG. 6. In FIG. 7, the horizontal axis corresponds to time or the number of operations, and the vertical axis corresponds to the position of the lens 105 corresponding to the first reference axis and the second reference axis. The unit of the vertical axis can be a length unit. In FIG. 7, the line 710 corresponds to the position of the lens 105 along the first reference axis. The line 720 corresponds to the position of the lens 105 along the second reference axis. The line H corresponds to the upper limit of the position of lens 105, and line L corresponds to the lower limit of the position of lens 105. As shown in FIG. 7, using the flow of FIG. 6, the lens 105 can be moved alternately along the first reference axis and the second reference axis, decreasing the time required for adjusting the position of the lens 105. After the $16^{th}$ unit of horizontal axis of FIG. 7, the line 710 and the line 720 enter a range between the line H and the line L. It means the lens 105 is moved into the abovementioned allowable range $ErMax_{x,y}$ in a short time to be close to the target position Target.

In summary, by using the control system 100 and the control method 300 provided by embodiments, the interference caused by the gravity is reduced. Further, the interference along one reference axis caused by the movement of the lens along the other reference axis is reduced. As a result, the control system and the control method are provided to accelerate the movement of a dual axis lens into the allowable range, for the lens to approach or reach the target position. It is an improvement to the automatic control of optical devices (such as projectors, cameras, light projection devices, light capture devices, etc.).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for an optical device, comprising:
   a detector detecting a current position of a lens;
   a processor calculating a distance between the current position and a target position;
   the processor determining whether the current position is within a predetermined range according to the distance; and
   the processor controlling a driving device to move the lens into an allowable range according to whether the current position is within the predetermined range;
   wherein;
   the predetermined range and the allowable range are corresponding to the target position;
   the processor controlling the driving device to move the lens into the allowable range according to whether the current position is within the predetermined range, comprises:
      if the current position is within the predetermined range, the driving device moving the lens to a predetermined position outside the predetermined range; and
      the driving device moving the lens from the predetermined position into the allowable range; and
   the allowable range is smaller than the predetermined range and within the predetermined range.

2. The control method of claim 1, further comprising:
   the processor determining whether the current position is within the allowable range according to the distance; and
   stopping moving the lens if the current position is within the allowable range.

3. The control method of claim 1, further comprising:
   the driving device moving the lens towards the target position with a minimum amount of movement.

4. The control method of claim 1, further comprising:
   a sensor detecting whether at least one of the optical device and the lens has been moved; and
   the processor adjusting the allowable range accordingly.

5. The control method of claim 1, wherein the processor controlling the driving device to move the lens into the allowable range according to whether the current position is within the predetermined range, comprises:
   if the current position is outside the predetermined range, the driving device moving the lens from the current position into the allowable range.

6. The control method of claim 1, wherein the processor controlling the driving device to move the lens into the allowable range, comprises:
   the processor generating a first distance corresponding to a first reference axis according to a position of the lens and the target position;
   the processor generating a first amount of movement according to the first distance;
   the driving device moving the lens by the first amount of movement along the first reference axis;
   the processor updating the first distance; and
   the processor determining whether the lens is within a first allowable range corresponding to the first reference axis and the allowable range according to the updated first distance.

7. The control method of claim 6, wherein the first amount of movement is equal to a difference of the first distance and a first error.

8. The control method of claim 7, further comprising:
   the processor generating a first interference value according to a movement of the lens along a second reference axis perpendicular to the first reference axis;
   the processor generating a first mechanical weight and a first interference weight according to gravity; and
   the processor generating the first error corresponding to the first reference axis according to a product of a first mechanical error and the first mechanical weight and a product of the first interference value and the first interference weight.

9. The control method of claim 6, wherein the processor controlling the driving device to move the lens into the allowable range, comprises:
   the processor setting a variable to be an initial value;
   if the lens is within the first allowable range, the processor adding a predetermined value to the variable to update the variable;
   the processor checking whether the updated variable is not smaller than a threshold; and
   if the updated variable is not smaller than the threshold, the processor determining the lens has been moved into the allowable range.

10. The control method of claim 9, wherein the initial value is 0, and the threshold is 3.

11. The control method of claim 6, wherein the processor controlling the driving device to move the lens into the allowable range, further comprises:
    the processor determining whether a last movement of the lens is along the first reference axis;
    if the last movement of the lens is not along the first reference axis, the driving device moving the lens along the first reference axis to move the lens into the allowable range; and
    if the last movement of the lens is along the first reference axis, the driving device moving the lens along a second reference axis perpendicular to the first reference axis to move the lens into the allowable range.

12. The control method of claim 6, wherein the processor controlling the driving device to move the lens into the allowable range, further comprises:
    the processor generating a second distance corresponding to a second reference axis according to the position of the lens and the target position, wherein the second reference axis is perpendicular to the first reference axis;
    the processor generating a second amount of movement according to the second distance;
    the driving device moving the lens by the second amount of movement along the second reference axis;
    the processor updating the second distance; and
    the processor determining whether the lens is within a second allowable range corresponding to the second reference axis and the allowable range according to the updated second distance.

13. The control method of claim 12, wherein the second amount of movement is equal to a difference of the second distance and a second error.

14. The control method of claim 13, further comprising:
the processor generating a second interference value according to a movement of the lens along the first reference axis;
the processor generating a second mechanical weight and a second interference weight according to gravity; and
the processor generating the second error corresponding to the second reference axis according to a product of a second mechanism error and the second mechanical weight and a product of the second interference value and the second interference weight.

15. The control method of claim 12, wherein the processor controlling the driving device to move the lens into the allowable range, further comprises:
the processor setting a variable to be an initial value;
if the lens is within the second allowable range, the processor adding a predetermined value to the variable to update the variable;
the processor checking whether the updated variable is not smaller than a threshold; and
if the updated variable is not smaller than the threshold, the processor determining the lens has been moved into the allowable range.

16. The control method of claim 1, further comprising:
the driving device alternately moving the lens along a first reference axis and along a second reference axis perpendicular to the first reference axis.

17. The control method of claim 1, wherein the optical device comprises a projector, and the target position is corresponding to a position of an image projected by the projector.

18. An optical device, comprising:
a lens; and
a control system, comprising:
    a detector configured to detect a current position of the lens;
    a driving device coupled to the lens, and configured to move the lens; and
    a processor, coupled to the detector and the driving device, and configured to calculate a distance between the current position and a target position, and control the driving device accordingly;
wherein:
the processor determines whether the current position is within a predetermined range according to the distance, the processor controls the driving device to move the lens to a predetermined position outside the predetermined range, and moves the lens from the predetermined position into an allowable range if the current position is within the predetermined range, the predetermined range and the allowable range are corresponding to the target position, and the allowable range is smaller than the predetermined range and within the predetermined range.

19. An optical device, comprising:
a lens; and
a control system, comprising:
    a detector configured to detect a current position of the lens;
    a driving device coupled to the lens, and configured to move the lens; and
    a processor, coupled to the detector and the driving device, and configured to calculate a distance between the current position and a target position, and determine whether a last movement of the lens is along the first reference axis to control the driving device accordingly;
wherein:
if the last movement of the lens is not along the first reference axis, the driving device moves the lens along the first reference axis to move the lens into the allowable range;
if the last movement of the lens is along the first reference axis, the driving device moves the lens along a second reference axis perpendicular to the first reference axis to move the lens into the allowable range; and
the driving device alternately moves the lens along the first reference axis and along the second reference axis.

* * * * *